Feb. 6, 1973　　　　　　　　M. W. MAR　　　　　　　　3,715,306
PROCESS FOR SEPARATING WATER FROM POLLUTANTS IN WATER
Filed Jan. 4, 1971　　　　　　　　　　　　　　　　3 Sheets-Sheet 3

INVENTOR
BY *Michael W. Mar*

*T.W. Secrest*

United States Patent Office 3,715,306
Patented Feb. 6, 1973

3,715,306
PROCESS FOR SEPARATING WATER FROM
POLLUTANTS IN WATER
Michael W. Mar, 2316 20th Ave. S.,
Seattle, Wash. 98144
Filed Jan. 4, 1971, Ser. No. 103,649
Int. Cl. B01d 11/00
U.S. Cl. 210—21                    38 Claims

ABSTRACT OF THE DISCLOSURE

The industrial processes produce many waste products. These waste products are often discharged into water and are carried away as pollutants in the water. These pollutants may be harmful to the water supplies and the animal life and plant life living in the water.

I have developed a method using a heterocyclic compound containing nitrogen and a solvent selected from the group consisting of an aromatic halogen compound and an aliphatic halogen compound to extract the pollutant from an aqueous mixture of water and pollutants.

This method produces a water which is substantially free of pollutants and may be discharged into a stream, a lake of fresh water, or a body of soft water, without fear of harming the plant life and the animal life in the body of water.

Further, with this method, the pollutants may be reused in the industrial process or may be used as a preservative or as an insecticide or may be collected and discharged in a special refuse region.

---

In many installations wood is treated with preservatives so that the wood may be used in salt water, fresh water, as piling, railroad ties, footings, and the like. The preservatives are impregnated into the wood under pressure and, usually, at an elevated temperature. The common preservatives are creosote, alone, or creosote in conjunction with pentachlorophenol, or a mixture of creosote and bunker oil. In the process the preservatives are mixed with water. After the wood has been treated, the mixture of the preservatives and water is drained away to separation apparatus so as to allow the main body of the preservatives to separate from the water. This leaves an aqueous solution or an aqueous mixture of water and a small amount of preservatives. This aqueous mixture of water and a small amount of preservatives, in the past, has usually been discharged into a body of water such as a body of salt water, or fresh water, or a stream or river. Such a discharge of water and preservatives creates a pollution problem.

Creosote is a mixture of many compounds, such as benzene, toluene, xylenes, phenol, cresols, naphthalene, methylnaphthalene, diphenyl, dimethylnaphthalene, acentanaphthalene, diphenyloxide, fluorene, methylfluorene, anthracene, phenanthrene, Carbazole, methylphenanthrene, 2-phenylnaphthalene, fluoranthene, pyrene, benzofluorene, benzophenylene sulfide, and chrysene, to name the more common ingredients of creosote. The discharge of some or all of these compounds, and possibly pentachlorophenol, into the aqueous bodies of water is harmful to the plant life and to the animal life in the water. In addition to the discharge of these products into the aqueous bodies of water, in the treatment of the wood with the preservatives some of the organic compounds in the wood may be dissolved by the preservatives and these, also, may be discharged into the aqueous bodies of water. The effect of this discharge is that these bodies of water are contaminated with pollutants.

I have worked around such a wood treating facility and have seen the problem involved in the discharge of the aqueous mixture of water and some of the preservatives. With this background, I have invented a method and apparatus to treat such an aqueous mixture of water and preservatives so as to separate the main body of the water from the preservatives. Then, the preservatives can be recycled with additional creosote and other preservatives to treat more wood, can be further processed to make an insecticide, or may be used as a preservative to coat wood by itself to decrease the decay of the wood. The water, after the preservatives have been removed, is substantialy free of preservatives and may be directlv discharged into a sewage treatment facility, a body of water, such as fresh water or salt water, without harm to the fresh water or salt water.

Accordingly, an object of this invention is to provide a method and apparatus to eliminate the discharge of certain pollutants into bodies of water; another object of this invention is to provide a method and apparatus for treating water contaminated with preservatives, such as preservatives for treating wood, to be able to substantially discharge pure water; a further important object and advantage of this invention is to be able to provide a method and an apparatus to reclaim preservatives for treating wood for use to again treat wood; another important object and advantage of this invention is to provide a method and an apparatus to reclaim discharged material comprising preservatives for treating wood and certain chemicals in wood for possible use as a fungicide and/or insecticide; a still additional important object and advantage of this invention is to provide a method and apparatus which is low in initial cost and inexpensive to use on a continuing basis; another object of this invention is to provide a method and apparatus for quickly removing contaminates, such as preservatives for treating wood from water; and, another important object and advantage of this invention is to provide a closed system which does not introduce pollutants into the atmosphere.

These and other important objects and advantages of the invention will be more particularly brought forth on reference to the accompanying drawings, the appended claims, and the detailed specification.

Figure 3:
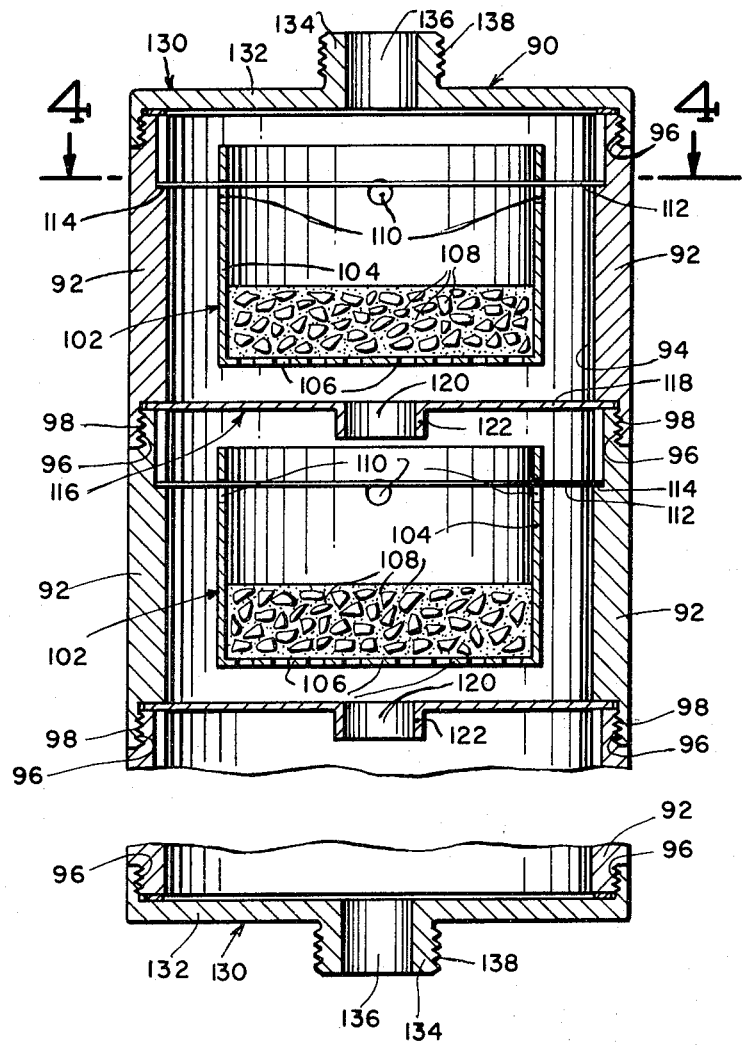
FIG. 3 is a longitudinal, vertical, cross-sectional illustration of a filter I have devised and which filter makes possible the continuous filtration of a liquid even though part of the filter bed is clogged.
Figure 4:
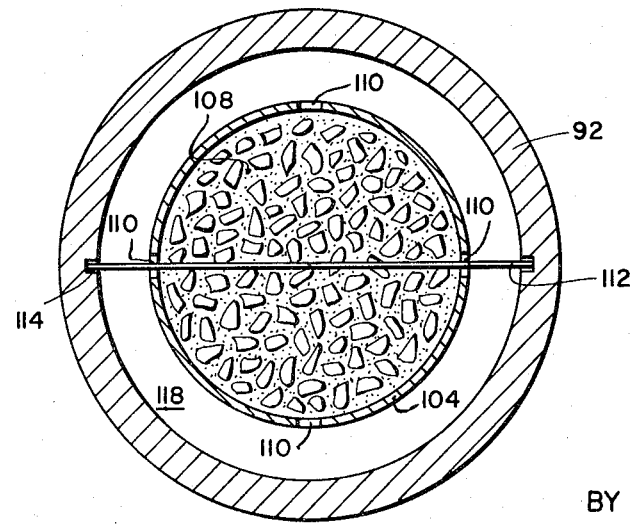

FIG. 4, taken on line 4—4 of FIG. 3, is a lateral, cross-sectional view of the details of construction of the filter.

Figure 2:
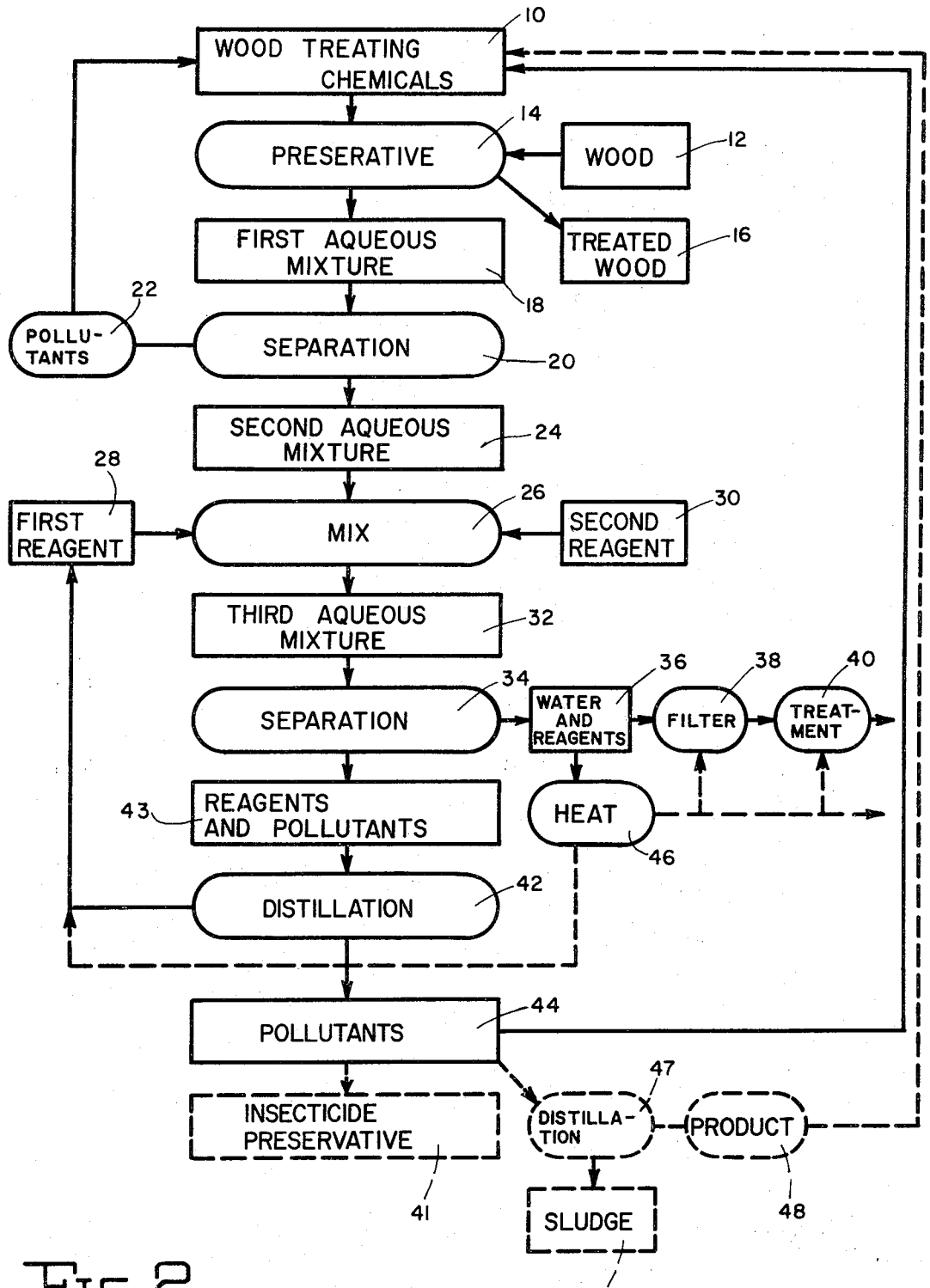
FIG. 2 is a schematic illustration of a method for processing wood with a chemical for preserving the wood and then for removing the wood-preserving chemical so as to have a discharge material which will not pollute water, the atmosphere, and the ground.

In FIG. 2 there is illustrated in schematic form, the steps for treating wood with chemicals for preserving the wood and then the step for removing the chemicals from an aqueous mixture so as to be able to discharge water which is substantially free of pollutants.

The normal wood-treating chemicals 10 are creosote, a mixture of creosote and a carrier such as a bunker oil or diesel oil, a mixture or creosote and pentachlorophenol, or pentachlorophenol and a carrier such as diesel oil or bunker oil.

A wood material 12, such as Douglas fir, hemlock, cedar, pine, spruce, white fir, alder, and redwood, to name a few are treated with the wood-treating chemical 10.

In the preservative step 14, the wood is introduced into a retort which is sealed. In some instances, the retort is approximately 6.5 feet in diameter and approximately 120 feet in length. There are tracks leading into the retort so as to be able to introduce the wood into the retort. The wood may be of various sizes, such as railroad ties, telephone poles, long piling, short piling, or other wood to be treated for preservation purposes.

After the wood 12 has been introduced into the retort, the retort is sealed and filled with the liquid preservative or the wood-treating chemicals 10. The retort is filled approximately eighty percent full of the chemicals 10. The wood-treating chemicals 10 and the wood 12 are heated to a temperature in the range of about 190° F. to 220° F. at a vacuum of about 26 inches of mercury for a period of time, sufficient to dry the wood. In normal instances this period of time is two to three hours. Also, some of the wood-treating chemicals, such as creosote, pentachlorophenol, and pyresote, a fire-retardant chemical, work into the penetrate into the wood.

Then, the retort is filled completely with the wood-treating chemicals 10. The wood 12 and the wood-treating chemicals 10 are heated to a temperature in the range of 190° F. to 220° F. at a pressure in the range of approximately 100 pounds per square inch to 135 pounds per square inch, for a period of time dependent on the desired penetration. This period of time varies from two hours to 12 hours. It is to be realized that the liquid in the retort at this time comprises the wood-treating chemicals 10 and also comprises some of the chemicals extracted from the wood. What these chemicals extracted from the wood are varies with the species of wood treated.

Then, the wood-treating chemicals 10 and the chemicals extracted from the wood are partially drained from the retort until the retort is about eighty percent full of the liquid. The temperature in the retort is adjusted to a temperature in the range of about 190° F. to 220° F. and a vacuum of 26 inches of mercury applied to the contents of the retort. This vacuum is maintained for approximately one hour.

Then, all of the wood-treating chemicals 10 and the chemicals extracted from the wood are removed or drained from the retort so as to leave, essentially, the wood in the retort. A vacuum of 26 inches of mercury is applied to the retort to remove preservatives from the surface of the wood so as to make it possible to easily and readily handle the wood treated with the wood-treating chemicals 10. This vacuum of approximately 26 inches of mercury is applied for about one hour. Further, the application of this vacuum also lessens the possibility of the wood bursting into fire.

Then, the treated wood 16 may be removed from the retort and further handled.

In the application of the vacuum of approximately 26 inches of mercury to the retort, before the wood is treated under pressure of approximately 100 pounds per square inch to 135 pounds per square inch and after the wood has been treated and also after all of the preservative has been removed from the retort there is drawn off a mixture of water plus certain wood-treating chemicals 10 to form an aqueous mixture of water plus pollutant 18. In the aqueous mixture 18 the water comes from the water in the wood. The wood may comprise a sap wood and a hard wood. The sap wood may have from 30 percent to 65 percent moisture. The hard wood has a less moisture or water content. Also, some of the wood-treating chemicals 10 are free to vaporize and to distill over with the water from the wood. The aqueous mixture 18 is trapped and allowed to separate into a heavy water layer and also into a lighter layer of wood-treating chemicals plus chemicals extracted from the wood. In step 20 it is seen that there is the separation of the pollutant and the water. One way of separating the pollutant and the water is to have a relatively large tank with a series of baffles. The baffles divide the tank into separate chambers. In these separate chambers, for example, the first chamber, the aqueous mixture 18 will separate into the lighter layer of wood treating chemicals 10 and the heavier layer of water plus some of the wood-treating chemicals 10. The lower aqueous layer can be introduced into the second chamber and allowed to separate into wood treating chemicals 10 and an aqueous mixture of water plus wood treating chemicals 10, of a lesser concentration than in the aqueous mixture 18. This separation can be continued until the aqueous mixture of water and wood-treating chemicals 10 is essentially water. The pollutant 22 can be introduced into the wood-treating chemicals 10 and reused in the further preservation of wood as previously outlined.

The second aqueous mixture 24 of water plus pollutants, comprising mainly water, is now treated to remove the pollutants and to discharge water essentially free of pollutants.

The second aqueous mixture 24 at step 26 may be mixed with a first reagent 28 and a second reagent 30. The first reagent 28 may be selected from the group consisting of an aromatic halogen compound and an aliphatic halogen compound. The second reagent 30 is a heterocyclic compound containing nitrogen. After the second aqueous mixture 24 and the first reagent 28 and the second reagent 30 have been mixed to form a third mixture 32 comprising water, pollutants, first and second reagents then the third mixture is allowed to separate at 34 into water and the first reagent and pollutants. It is to be understood that the water 36 comprises a trace of the first reagent 28, the second reagent 30 and maybe a trace of the pollutants. The water 36 is then filtered at 38 to remove the trace of the first reagent 28, the second reagent 30 and the pollutant. After the water 36 has been filtered, it is possible to subject the water to a bacteria treatment 40 so as to remove any phenolic compounds which may be in the water. The bacteria treatment may be with a mesophyllic bacteria at a temperature in the range of about 54° F. to 98° F. or may be with a thermophyllic bacteria at a temperature in the range of about 98° F. to 110° F. At this time, the concentration of phenolic compounds in the water is less than two parts per million. It is essential in treating an aqueous solution containing phenolic compounds with mesophyllic bacteria or thermophyllic bacteria that the concentration of a phenolic compound be less than 150 parts per mililon. If the concentration of the phenolic compounds be greater than 150 parts per million, there is shock to the bacteria and the bacteria are killed.

After the separation step 34, the first reagent and pollutants 43 also containing a trace of the second reagent, are distilled at 42 so as to distill the first reagent 28 for reuse at step 26. The pollutants 44 are left after the distillation step 42. It is to be realized that the first reagent 28 comprises a trace of the second reagent 30. Further, the pollutants 44 comprise a trace of the second reagent 30 and a trace of the first reagent 28.

To repeat, the first reagent 28 may be reused in the mixing step 26.

As a variation of the above, the water plus reagents 36 may be heated at the step 46, at a temperature in the range of 170° F. to 180° F., to remove the first reagent 28 and to leave a water substantially free of the first reagent 28. Again, the first reagent 28 may be reused in the mixing step 26. The water left after the heating step 46 may be introduced into the filter 38 or may be subjected to bacteria treatment 40 or may be discharged into a body of water, as this water is substantially free of any polluting material, such as phenolic materials and the like. The concentration of phenolic materials at this step is approximately two parts per million.

The pollutants 44 may be recovered and used as an insecticide and/or preservative 41. Or, the pollutants 44 may be distilled as at step 42 at a temperature of 200° F. or greater than 200° F. so as to make a product 48, which can be introduced and mixed with the wood-treating chemicals 10, and to leave a sludge 50. The sludge 50 may be used as an insecticide and/or preservative which is different from the insecticide and/or preservative 41. Another alternative is to introduce the pollutants 44 directly into and to mix with the wood treating chemicals 10 as to reuse the pollutants 44. In this manner the pollutants 44 are not allowed to contaminate the water, air, and the countryside. The pollutants 44 are reused as a useful wood treating chemical 10.

Figure 1:
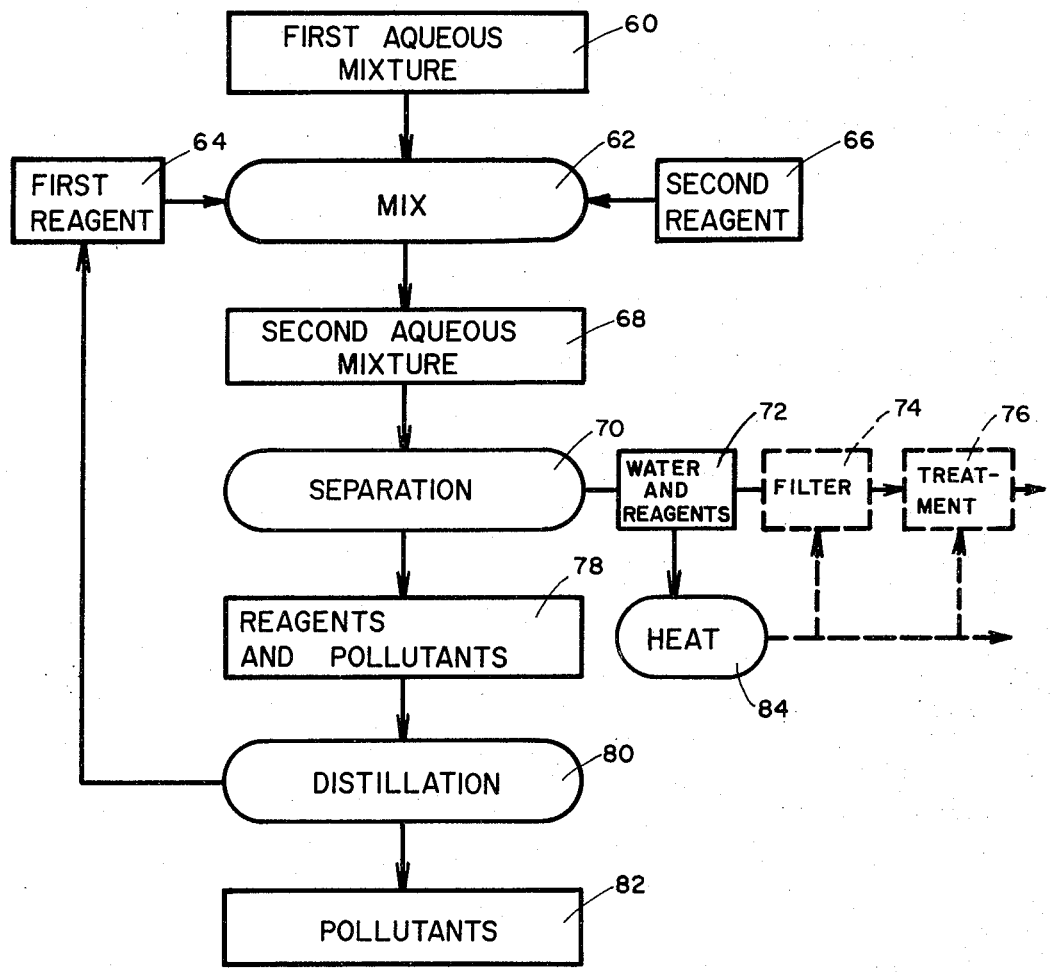
FIG. 1 is a schematic illustration of a method for treating an aqueous mixture comprising water and pollutant, such as preservatives for treating wood.

In FIG. 1 there is presented a schematic flow sheet for the treatment of a first aqueous mixture of water of pollutants 60. The pollutant may be pentachlorophenol, chlorinated phenolic compounds, coal tar and chlorinated solvents.

The first aqueous mixture 24 of water plus pollutants, comprising mainly water, is now treated to remove the pollutants and to discharge water essentially free of pollutants.

The first aqueous mixture 60 at step 62 may be mixed with a first reagent 64 and a second reagent 66. The first reagent 64 may be selected from the group consisting of an aromatic halogen compound and an aliphatic halogen compound. The second reagent 66 is heterocyclic compound containing nitrogen. After the first aqueous mixture 60 and the first reagent 64 and the second reagent 66 have been mixed to form a second mixture 68 comprising water, pollutants, first and second reagents, then the second mixture 68 is allowed to separate at 70° F. into water and the first reagent 28 and the pollutants. It is to be understood that the water 72 comprises a trace of the first reagent 64, the second reagent 66 and may be a trace of the pollutants. The water 72 is then filtered at 74 to remove the trace of the first reagent 64, the second reagent 68 and the pollutant. After the water 72 has been filtered, it is possible to subject the water to a bacteria treatment 76 so as to remove any phenolic compounds which may be in the water. The bacteria treatment may be a mesophyllic bacteria at a temperature in the range of about 54° F. to 98° F., or may be with a thermophyllic bacteria at a temperature in the range from about 98° F. to approximately 110° F. At this time, the concentration of the phenolic compounds in the water should be less than two parts per million.

After the separation step 70, the first reagent and pollutants 78 also contain a trace of the second reagent 66 and are distilled at 80 so as to distill the first reagent 64 for reuse in step 62. The temperature distillation with step 80 is approximately 5° F. greater than the boiling point of the first reagent 64. The pollutants 82 are locked after the distillation step 80. It is to be realized that the first reagent 64 comprises a trace of the second reagent 66. Further, the pollutants 82 may comprise a trace of the second reagent 66 and the first reagent 64.

To repeat, the first reagent 64 may be reused in the mixing step 62.

As a variation of the above, the water plus the reagents 72 may be heated at step 84, at a temperature in the range of approximately 160° to about 170° F., to remove the first reagent 64 and to leave the water substantially free of the first reagent 64. Again, the first reagent 64 may be reused in the mixing step 62. The water after the heating step 84 may be introduced into the filter 74 or may be subjected to bacteria treatment 76 or may be discharged into a body of water, as this water is substantially free of any polluting materials, such as phenolic materials, chlorinated solvents, and chlorinated hydrocarbons. The concentration of these pollutants at this step is approximately two parts per million.

In FIGS. 3 and 4, there is illustrated a filter which can be used in step 38 of FIG. 2 and step 74 of FIG. 1. This filter 90, in a lateral cross-sectional configuration, has a generally right circular cylindrical configuration. The filter 90 is composed of a number of individual sections.

A section comprises a cylindrical wall 92. The cylindrical wall 92 has an interior surface 94. The outer edges of the cylindrical wall 92, and on the interior surface 94, are interiorally threaded at the upper part 96 and at the lower part 98. In the upper part of the cylindrical wall 92 there are two slots 100 diametrically opposite to each other.

In each section there is a filter unit 102, and a lateral cross-sectional configuration, of a generally circular configuration. The filter unit 102 comprises a generally cylindrical member having a wall 104. The filter unit 102 is essentially a right circular cylinder. On the lower end of the filter unit 102 there is a filter bed support 106. The filter bed support 106 supports the filter bed 108 which may be activated carbon or other suitable filter material.

In the upper part of the wall 104 there are four openings 110, at 90° angles with each other or at right angles. A support rod 112 projects through two of the openings 110 and rests on the ledge 114 defined by the wall 92 and the slot 100.

It is seen that the filter unit 102 is free to rock or rotate around the support rod 112.

Between the sections there is positioned a separator 116 having a wall 118, a passageway 120 through the wall 118 and a circular wall or spout 122. It is seen that the separator 116 also functions as a gasket between the lower part of the upper section and the upper part of the lower section. The upper threads 96 of the lower section can be mated with the lower threads 98 of the upper section so as to stack as many filter units 102 as desired. Possibly, one filter unit 102 will be satisfactory. However, if one filter unit 102 is not satisfactory, then it is possible to stack five or ten, or more sections, to realize the filtration desired.

There is an upper member 130 having an upper wall 132, and an outwardly projected cylindrical wall 134 defining an opening 136 in the wall 132. The exterior or interior surface, of the nipple 134, may be threaded at 138. It is seen that the unit 130 is on the upper part, or inlet portion, of the filter sections. Also, it is seen that the unit 130 is on the lower part, or the outlet of the filter sections.

From the foregoing, it is seen that if one of the filter beds 108 of a filter unit 102 becomes clogged so as not to allow liquid to flow through the filter bed, then the liquid can flow out the openings 110, down the outside of the filter unit 102, and on to the separator 106 and through the opening 120 to the next lower filter unit 102.

After the filter has been in operation for a period of time, it may be desirable to replace the filter bed 108. This is easily accomplished by disassembling the sections of the filter 90, removing the old filter bed 108, and adding the new filter bed 108 to the filter units 102. Then, the sections of the filter can be reassembled to form the filter 90.

In the following part of the specification, there are presented a number of examples illustrating the teachings of this invention. The pollutants in the various fractions such as the original aqueous solution of pollutants 18 or 60, the pollutants in the aqueous solution 36 or 72 after extraction and the pollutants in the extracted liquids or in the reagents were determined by means of a Beckman gas chromatograph model No. GC–5. A one microliter sample was introduced into the gas chromatograph and the temperature plotted on graph paper. Then, the area under the graph was determined by means of a planimeter or by means of an integrator in the recorder of the gas chromatograph. The area of the various fractions was compared with the area for the original aqueous solution containing the pollutants. In the following examples, the original aqueous solution containing the pollutants corresponded to the first aqueous mixture of water plus pollutants 18 of FIG. 2 or the first aqueous mixture of water plus pollutants 60 of FIG. 1. The various fractions corresponded to the water plus reagents and pollutants 36 and the reagents plus pollutants 42 of FIG. 2, or water plus reagents plus pollutants 72 and reagents plus pollutants 78 of FIG. 1.

EXAMPLE I

| Component: | Volume (ml.) |
|---|---|
| Aqueous solution of pollutants | 300 |
| Carbon tetrachloride | 60 |
| Pyridine | 1.0 |

In the first aqueous mixture of water plus pollutants, the pollutants had a boiling point in the range of approximately 150° C. to about 185° C.

The aqueous solution of pollutants was extracted, in a batch extraction process, at room temperature, by shaking the mixture of carbon tetrachloride and pyridine with the aqueous solution for about five (5) seconds. Then, the resulting mixture was allowed to separate into a lower layer of carbon tetrachloride, pyridine and pollutants and an upper layer of water plus reagents plus pollutants.

In the lower layer of carbon tetrachloride plus pollutants, the pollutants had a boiling point in the range of approximately 145° C. to about 185° C. The ratio of pollutants in the first carbon tetrachloride layer to the aqueous solution was approximately 0.54 to 54%.

In the water layer, containing pollutants and a small amount of pyridine and carbon tetrachloride, the pollutants had a boiling point of approximately 150° C. The ratio of pollutants in the first water layer to the ratio of pollutants in the original aqueous solution of pollutants was approximately 0.45 or 45%.

Then, the first water layer was once again extracted with a mixture of fresh carbon tetrachloride, about 60 ml. This batch extraction was at room temperature and for about five (5) seconds and accomplished by shaking the mixture. There resulted a layer of carbon tetrachloride, pyridine and pollutants, and the pollutants had a boiling point in the range of about 150° C. to approximately 165° C. The ratio of the pollutants in the second carbon tetrachloride layer as contrasted to the pollutants in the first carbon tetrachloride layer was approximately 0.24 or 24%.

The water layer had pollutants which boiled at approximately 150° C. The ratio of pollutants in the second water layer as compared with the pollutants in the original aqueous solution of pollutants was approximately 0.33 or 33%.

From the foregoing it is seen that the carbon tetrachloride and pyridine layer extracted over one-half of the pollutants from the aqueous solution of pollutants. Also, the resulting water layer, from the second extraction contained a lower concentration of pollutants. Further, it is seen that when pyridine is absent, the transfer of pollutants from the aqueous solution to the carbon tetrachloride is lessened.

EXAMPLE II

The aqueous solution used was the same as in Example I.

| Component: | Volume (ml.) |
|---|---|
| Aqueous solution of pollutants | 300 |
| Carbon tetrachloride | 60 |
| Pyridine | 1.0 |

In this batch process the aqueous solution of pollutants with the carbon tetrachloride and pyridine was boiled for about fifteen (15) minutes under a reflux condenser so that the carbon tetrachloride was introduced back into the boiling mixture.

In the first extraction, after the mixture was allowed to cool, the pollutants had a boiling point in the range of about 145° C. to about 185° C. The ratio of the pollutants in the carbon tetrachloride to the pollutants in the original aqueous solution and pyridine mixture was approximately 0.61 or 61%.

The water layer had pollutants which had a boiling point in the range of about 150° C. The ratio of the pollutants in the water layer as compared with the original aqueous solution of pollutants was 0.31 or 31%.

Then, the water layer after the first extraction was boiled and refluxed for about fifteen (15) minutes with a fresh solution of 60 ml. of carbon tetrachloride. Then, this mixture was allowed to cool and to separate into a lower layer of carbon tetrachloride, pyridine and pollutants and an upper layer of water, pyridine and pollutants.

In the layer of carbon tetrachloride the pollutants had a boiling point in the range of about 150° C. and approximately 165° C. The ratio of the pollutants in the second layer of carbon tetrachloride as compared to the first layer of carbon tetachloride was 0.47 or 47%.

The pollutants in the second water layer had a boiling point in the range of approximately 150° C. The ratio of the pollutants in the second water layer as compared with the pollutants in the original aqueous solution of pollutants was 0.14 or 14%; and, the ratio of pollutants in the second water layer as compared with the first water layer was 0.47 or 47%.

From this example, it can be seen that substantially all of the pollutants were transferred from the original aqueous solution of pollutants to the carbon tetrachloride and pyridine solution. Also, after the second extraction of the aqueous solution of pollutants with the carbon tetrachloride the resulting water layer had substantially no pollutants. Further, it is seen that when pyridine is absent the transfer of pollutants from the aqueous solution to the carbon tetrachloride is lessened.

EXAMPLE III

The aqueous solution used was the same as in Example I.

| Component: | Volume (ml.) |
|---|---|
| Aqueous solution of pollutants | 300 |
| Carbon tetrachloride | 60 |
| Pyridine | 2.0 |

This example was run to show the effect of increasing the concentration of pyridine from 1.0 ml. to 2.0 ml., see preceding Example I. In this cold batch process, the aqueous solution of pollutants was shaken with a mixture of carbon tetrachloride and pyridine for about five (5) seconds. After the first extraction with the mixture of carbon tetrachloride and pyridine, the resulting mixture was allowed to separate into a lower carbon tetrachloride, pyridine and pollutant layer and an upper water, pyridine and pollutant layer. In the lower carbon tetrachloride layer the pollutants had a boiling point in the range of approximately 150° C. and about 185° C. The ratio of pollutants in the carbon tetrachloride layer as compared with the pollutants in the original aqueous solution of pollutants was 0.61 or 61%.

In the upper aqueous layer the pollutants had a boiling point in the range of about 150° C. The ratio of the pollutants in the upper aqueous layer as compared with the pollutants in the original aqueous solution of pollutants was 0.35 or 35%.

Then, the first aqueous layer was again mixed by shaking with about 60 cc. of carbon tetrachloride for five (5) seconds at room temperature. The resulting mixture was allowed to separate into a lower layer of carbon tetrachloride and pollutants, and an upper layer of water and pollutants. In the lower layer of carbon tetrachlorides the pollutants had a boiling point in the range of about 150° C. and about possibly 185° C. The ratio of the pollutants in the second carbon tetrachloride layer as compared with the concentration of the pollutants in the first carbon tetrachloride layer was 0.22 or 22%.

In the second aqueous layer the pollutants had a boiling point in the range of about 150° C. The ratio of the pollutants in the second aqueous layer as compared to the pollutants in the original aqueous solution of the pollutants was 0.19 or 19%; and, the ratio of the pollutants in the second aqueous layer as compared to the concentration of the pollutants in the first extracted aqueous layer was 0.56 or 56%.

From the foregoing it is seen that the increase in the concentration of the pyridine in the carbon tetrachloride layer assists in the transfer of pollutants from the aqueous solution to the carbon tetrachloride. Also, it is seen that a large percentage of pollutants are transferred from the original aqueous solution of pollutants to the carbon tetrachloride and pyridine mixture. Further, when pyridine is absent, the transfer of pollutants from the aqueous solution to the carbon tetrachloride is lessened.

EXAMPLE IV

The aqueous solution used was the same as in Example I.

| Component: | Volume (ml.) |
|---|---|
| Aqueous solution of pollutants | 300 |
| Carbon tetrachloride | 60 |
| Pyridine | 2.0 |

In this example the aqueous solution of pollutants, carbon tetrachloride and pyridine were refluxed about fifteen (15) minutes at the boiling point of the mixture. This experiment was conducted to show the effect of the increased concentration of the pyridine with respect to purifying the aqueous solution of pollutants, see preceding Example II.

The mixture was refluxed, allowed to cool and to settle into a lower layer of carbon tetrachloride, pyridine and pollutants, and an upper layer of water, pyridine and pollutants.

In the lower layer of carbon tetrachloride the pollutants had a boiling point in the range of about 145° C. to approximately 185° C. The ratio of the approximate quantity of pollutants in the original aqueous solution of pollutants was about 0.64 or 64%.

In the water layer the pollutants had a boiling point in the range of about 150° C. the approximate ratio of pollutants in this aqueous layer as compared to the concentration of pollutants in the original aqueous solution of pollutants was 0.21 or 21%.

From this it can be seen that with one extraction of the original aqueous solution of pollutants with carbon tetrachloride and pyridine that a large percentage of the pollutants transferred from the original aqueous solution to the mixture of carbon tetrachloride and pyridine.

EXAMPLE V

The aqueous solution was the same as in Example I.

| Component | Volume (ml.) |
|---|---|
| Aqueous solution of pollutants | 300 |
| Carbon tetrachloride | 60 |
| Pyridine | 3.0 |

In this batch cold process, for extracting pollutants from the aqueous solution of pollutants, the concentration of the pyridine was increased to determine the effect of such an increase, see preceding Examples I and III.

The aqueous solution of pollutants, carbon tetrachloride and pyridine was mixed at room temperature for about five (5) seconds and allowed to settle into a lower layer of carbon tetrachloride, pyridine and pollutants, and an upper layer of water, pyridine and pollutants.

In the lower layer of carbon tetrachloride, the pollutants had a boiling point in the range of about 145° C. to 185° C. and in the water layers the pollutants had a boiling point in the range of about 155° C.

In the carbon tetrachloride layer, the ratio of the approximate quantity of pollutants as compared with the quantity of pollutants in the original aqueous solution of pollutants was about 0.71 or 71%.

In the aqueous layer the approximate ratio of pollutants as compared to the pollutants in the original aqueous solution of pollutants was 0.29 or 29%.

From this, it can be seen that with an increase in the concentration of pyridine in the carbon tetrachloride that there is a greater transfer of pollutants from the aqueous solution of pollutants to the mixture of carbon tetrachloride, pyridine and pollutants.

EXAMPLE VI

The aqueous solution was the same as in Example I.

| Component: | Volume (ml.) |
|---|---|
| Aqueous solution of pollutants | 300 |
| Carbon tetrachloride | 60 |
| Pyridine | 3.0 |

In this hot batch process the concentration of the pyridine was increased to determine the effect of such an increase in the transfer of pollutants from the aqueous solution to the mixture of carbon tetrachloride and pyridine, see Examples II and IV. The mixture of the aqueous solution of pollutants, carbon tetrachloride and pyridine was refluxed at the boiling point of such a mixture for approximately fifteen (15) minutes. Then this mixture was allowed to cool and to separate into an upper layer of water, pyridine and pollutants, and a lower layer of carbon tetrachloride, pyridine and pollutants.

In the lower layer of carbon tetrachloride, the pollutants had a boiling point in the range of about 145° C. to 185° C. The approximate ratio of pollutants in the carbon tetrachloride layer as compared to the pollutants in the original aqueous solution of pollutants was 0.70 or 70%.

In the aqueous layer the pollutants had a boiling point in the range of approximately 155° C. The approximate ratio of pollutants in the original aqueous solution of pollutants was 0.27 or 27%.

From this it can be seen that the increase of pyridine assists in the transfer of pollutants from the aqueous solution to the carbon tetrachloride and pyridine mixture.

EXAMPLE VII

The aqueous solution was the same as in Example I.

| Component: | Volume (ml.) |
|---|---|
| Aqueous solution of pollutants | 300 |
| Carbon tetrachloride | 60 |
| Pyridine | 6.0 |

In this cold batch process, the concentration of the pyridine was increased to determine its effect on the transfer of pollutants from the aqueous solution to the mixture of carbon tetrachloride and pyridine, see preceding Examples, I, III and V.

The aqueous solution of pollutants, carbon tetrachloride and pyridine was mixed for about five (5) seconds at room temperature and then allowed to separate into a lower layer of carbon tetrachloride, pyridine, and pollutants, and an upper layer of water, carbon tetrachloride and pyridine.

In the lower layer of carbon tetrachloride the pollutants had a boiling point in the range of approximately 145° C. to 190° C. The approximate quantity of pollutants in the carbon tetrachloride layer as compared with the approximate quantity of the pollutants in the original aqueous solution of pollutants was 0.77 and 77%.

In the aqueous layer the pollutants had a boiling point of approximately 160° C. The approximate ratio of pollutants in the aqueous layer as compared to the pollutants in the original aqueous solution of pollutants was 0.21 or 21%.

From the foregoing it is seen that a large percentage of pollutants were transferred from the original aqueous solution of pollutants to the carbon tetrachloride and pyridine mixture. Also, it is seen that the pyridine existed in the transfer of the pollutants from the original aqueous solution to the mixture of carbon tetrachloride and pyridine.

EXAMPLE VIII

The aqueous solution was the same as in Example I.

| Component: | Volume (ml.) |
|---|---|
| Aqueous solution of pollutants | 300 |
| Carbon tetrachloride | 60 |
| Pyridine | 6.0 |

In this hot batch process, the concentration of the pyridine was increased to determine the effect of such an increase in the transfer of pollutants from the aqueous solution of pollutants to the carbon tetrachloride.

In this hot batch process, the mixture of the aqueous solution of pollutants, carbon tetrachloride and pyridine was refluxed at the boiling point of such a mixture for about fifteen (15) minutes. Then, this mixture was allowed to cool and to settle into a lower layer of carbon-tetrachloride, pyridine, and pollutants, and into an upper layer of water, pyridine and pollutants.

In the lower layer of carbon tetrachloride, the boiling point of the pollutants was about 145° C. to 190° C. The approximate quantity of pollutants in the carbon tetrachloride layer as compared to the pollutants in the original aqueous solution of pollutants was 0.73 or 73%.

In the aqueous layer, the boiling point of the pollutants was approximately 155° C. The approximate ratio of the concentration of pollutants in the aqueous layer as compared to the concentration of pollutants in the original aqueous solution of pollutants was 0.23 or 23%.

From this it can be seen that the increase in the concentration of pyridine assists, see preceding Examples I, IV, VI in the transfer of pollutants from the aqueous solution to the mixture of carbon tetrachloride and pyridine.

EXAMPLE IX

The aqueous solution used was the same as Example 1.

| Component: | Volume (ml.) |
|---|---|
| Aqueous solution of pollutants | 300 |
| Carbon tetrachloride | 100 |
| Pyridine | 10 |

In this cold batch process, the quantity of the carbon tetrachloride and the quantity of the pyridine, with respect to the quantity of the aqueous solution of pollutants, were increased to determine the effect on the transfer of pollutants from the aqueous solution of pollutants to the mixure of carbon tetrachloride and pyridine, see preceding Examples I, III, V, and VII, especially VII.

The aqueous solution of pollutants, carbon tetrachloride and pyridine was mixed for about five (5) seconds at room temperature and then allowed to separate into a lower layer of carbon tetrachloride, pyridine and pollutants, and an upper layer of water, carbon tetrachloride and pyridine. In the lower layer of carbon tetrachloride the pollutants had a boiling point in the range of approximately 145° C. to 190° C. The approximate ratio of pollutants in the carbon tetrachloride as compared with the approximate quantity of pollutants in the original aqueous solution was 0.76 or 76%.

In the aqueous layer, the pollutants had a boiling point of approximately 155° C. The approximate ratio of the pollutants in the aqueous layer as compared to the pollutants in the original aqueous solution of pollutants was 0.22 or 22%.

From the foregoing it is seen that with an increase in the ratio of carbon tetrachloride and pyridine to the aqueous solution of pollutants, there is an increase in the transfer of pollutants from the aqueous solution to the carbon tetrachloride and pyridine solution.

EXAMPLE X

| Component: | Volume (ml.) |
|---|---|
| Aqueous solution of pollutants | 300 |
| Carbon tetrachloride | 100 |
| Pyridine | 10 |

In this hot batch process, the concentration of the carbon tetrachloride and the pyridine, as compared with the quantity of original aqueous solution of pollutants, see Examples II, IV, VI, and VIII, increased.

In this hot batch process, the mixture of the aqueous solution of pollutants, carbon tetrachloride and pyridine was refluxed at the boiling point of such a mixture for about fifteen (15) minutes. Then, this mixture was allowed to cool and to settle into a lower layer of carbon tetrachloride, pyridine, and pollutants, and into an upper layer of water, pyridine and pollutants.

In the lower layer of carbon tetrachloride, the boiling point of the pollutants was about 145° C. to about 190° C. The ratio of the approximate quantity of pollutants in the carbon tetrachloride layer as compared to the pollutants in the original aqueous solution of pollutants was about 0.76 or 76%.

In the aqueous layer, the boiling point of the pollutants was approximately 160° C. The approximate ratio of the pollutants in the aqueous layer as compared to the pollutants in the original aqueous solution was 0.25 or 25%.

From this it can be seen that an increase in ratio of carbon tetrachloride and pyridine mixture to the aqueous solution of pollutants increase a transfer of pollutants to the carbon tetrachloride and pyridine layer, see preceding Examples II, IV, VI, and VIII.

EXAMPLE XI

This aqueous solution of pollutants was a new aqueous solution.

| Component: | Volume (ml.) |
|---|---|
| Aqueous solution of pollutants | 300 |
| 1,1,1-trichloroethane | 60 |
| Pyridine | 2.0 |

In this example there was used another aqueous solution of water with pollutants. The pollutants in this aqueous solution of water had a boiling point in the range of approximately 150° C. to about 190° C.

The mixture of aqueous solution of pollutants, trichloroethane and pyridine was mixed for about five (5) seconds at room temperature as in previous cold batch processes. Then the mixture was allowed to settle into a lower layer of trichloroethane, pyridine and pollutants and an upper layer of water, pyridine and pollutants.

The ratio of the pollutants in the water layer as compared to the pollutants in the original aqueous solution of pollutants was about 0.31 or 31%. From this it can be seen that a large percentage of the pollutants have been transferred from the aqueous solution of pollutants to the mixture 1,1,1-trichloroethane and pyridine.

The water layer was then mixed with approximately 60 ml. of trichloroethane and 2 ml. of pyridine, by shaking by hand for about five (5) seconds at room temperature. Then, this mixture was allowed to settle into a lower layer of trichloroethane, pyridine and pollutants and a second upper layer of water, pyridine and pollutants.

The ratio of the pollutants in the second water layer as compared to the pollutants in the original aqueous solution of pollutants was about 0.11 or 11%, and the ratio of pollutants in the second water layer as compared to the pollutants in the first water layer was about 0.35 or 35%.

From this it can be seen that substantially all of the pollutants have been transferred from the aqueous solution of pollutants to the mixture of 1,1,1-trichloroethane and pyridine, by mixing for approximately ten (10) seconds by hand at room temperature.

EXAMPLE XII

The aqueous solution of Example XI was used in this instance.

| Component: | Volume (ml.) |
|---|---|
| Aqueous solution of pollutants | 300 |
| Trichloroethylene | 60 |
| Pyridine | 2.0 |

In this example there was used another aqueous solution of water with pollutants. The pollutants in this aqueous solution of water had a boiling point in the range of approximately 150° C. to 190° C.

The mixture of the aqueous solution of pollutants, trichloroethylene and pyridine was mixed for about five (5) seconds at room temperature as in previous cold batch processes. Then this mixture was allowed to settle into a lower layer of trichloroethylene, pyridine and pollutants, and an upper layer of water, pyridine and pollutants.

The ratio of the pollutants in the water layer as compared with the pollutants in the original aqueous solution was about 0.28 or 28%. From this it can be seen that a large percentage of the pollutants have been transferred from the aqueous solution of the pollutants to the mixture of trichloroethylene and pyridine.

Then the water layer was mixed with 60 ml. of trichloroethylene and 2 ml. of pyridine by shaking the aqueous mixture for about five (5) seconds at room temperature. This aqueous mixture was allowed to settle into a lower layer of trichloroethylene, pyridine and pollutants and a second upper layer of water, pyridine and pollutants.

The ratio of the pollutants in the second water layer as compared with the pollutants in the original aqueous solution of pollutants was about 0.08 or 8%, and the ratio of pollutants in the second water layer as compared with the pollutants in the first water layer was about 0.28 or 28%. From this it can be seen that substantially all of the pollutants were transferred from the aqueous solution of the pollutants to a mixture of trichloroethylene and pyridine by mixing with trichloroethylene and pyridine for ten (10) seconds at room temperature.

EXAMPLE XIII

The aqueous solution of Example XI was used in this instance.

| Component: | Volume (ml.) |
|---|---|
| Aqueous solution of pollutants | 300 |
| Perchloroethylene | 60 |
| Pyridine | 2.0 |

In this example the mixture of aqueous solution of pollutants, perchloroethylene and pyridine was mixed for about five (5) seconds at room temperature by shaking, as in previous cold batch processes. Then this mixture was allowed to settle into a lower layer of perchloroethylene, pyridine and pollutants and an upper layer of water, pyridine and pollutants.

The ratio of the pollutants in the water layer as compared with the pollutants in the original aqueous solution was about 0.48 or 48%. From this it can be seen that there was a substantial transfer of the pollutants from the aqueous solution of pollutants to the mixture of perchloroethylene and pyridine.

Then, the first water layer was mixed with 60 ml. of perchloroethylene and 2 ml. of pyridine by shaking by hand for about five (5) seconds at room temperature. This mixture was allowed to settle into a lower layer of perchloroethylene, pyridine and pollutants, and a second upper layer of water, pyridine and pollutants.

The ratio of the pollutants in the second water layer as compared to the pollutants in the original aqueous solution of pollutants was about 0.31 or 31%, and the ratio of pollutants in the second water layer as compared to the pollutants in the first water layer was 0.65 or 65%.

EXAMPLE XIV

| Component: | Volume (ml.) |
|---|---|
| Aqueous solution of pollutants | 300 |
| 1,2,4-trichlorobenzene | 60 |
| Pyridine | 2.0 |

In this example, the mixture of pollutants, trichlorobenzene and pyridine was mixed, by shaking by hand for about five (5) seconds at room temperature as in previous cold batch processes. Then this mixture was allowed to settle into a lower layer of trichlorobenzene, pyridine and pollutants and an upper layer of water, pyridine and pollutants.

The ratio of the pollutants in the first water layer as compared with the pollutants in the original aqueous solution of pollutants was about 0.29 or 29%. From this it can be seen that a large percentage of the pollutants transferred from the aqueous solution of pollutants to the mixture of 1,2,4-trichlorobenzene and pyridine.

Then the first water layer was mixed with 60 ml. of 1,2,4-trichlorobenzene and 2 ml. of pyridine, by shaking by hand for five (5) seconds at room temperature. Then this mixture was allowed to settle into a lower layer of trichlorobenzene, pyridine and pollutants and an upper layer of water, pyridine and pollutants.

The ratio of the pollutants in the second water layer as compared to the pollutants in the original aqueous solution of pollutants was about 0.14 or 14%, and the ratio of pollutants in the second water layer as compared to the pollutants in the first water layer was about 0.14 or 14%. From this it can be seen that by shaking the original aqueous solution of water with the reagents for about 10 (ten) seconds that about 85% of the pollutants can be removed from the original aqueous solution of the pollutants.

EXAMPLE XV

The aqueous solution of Example XI is used in this instance.

| Components: | Volume (ml.) |
|---|---|
| Aqueous solution of pollutants | 300 |
| Trichlorotrifluoroethane | 60 |
| Pyridine | 2 |

The mixture of the aqueous solution of pollutants, trichlorotrifluoroethane and pyridine was mixed, by shaking by hand, for about five (5) seconds at room temperature as in previous cold batch processes. Then this mixture was allowed to settle into a lower layer of trichlorotrifluoroethane, pyridine and pollutants and a first upper layer of water, pyridine and pollutants.

The ratio of the pollutants in the first water layer as compared to the pollutants in the original aqueous solution of the pollutants was about 0.64 or 64%.

Then, the first water layer was again mixed with 60 ml. of trichlorotrifluoroethane and two ml. of pyridine by shaking by hand for about five (5) seconds at room temperature. This mixture was allowed to settle into a lower layer of trichlorotrifluoroethane, pyridine and pollutants and a second upper layer of water, pyridine and pollutants.

The ratio of the second water layer as compared to the pollutants in the original aqueous solution of pollutants was about 0.14 or 14%, and the ratio of the second water layer as compared to the first water layer 0.23 or 23%. From this you can see that a large percentage of the pollutants have been transferred to the mixture of trichlorotrifluoroethane and pyridine.

EXAMPLE XVI

The aqueous solution Example XI was used in this instance.

| Components: | Volume (ml.) |
|---|---|
| Aqueous solution of pollutants | 300 |
| Methylene chloride | 60 |
| Pyridine | 2.0 |

The mixture of the aqueous solution of pollutants, methylene chloride and pyridine, was mixed, by shaking by hand, for about five (5) seconds at room temperature as in previous cold batch processes. Then this mixture was allowed to settle into a lower layer of methylene chloride, pyridine and pollutants and a first upper layer of water, pyridine and pollutants. The boiling point of the pollutants in the water layer was in the range of about 155° C. to about approximately 175° C. The boiling point of the pollutants in the methylene chloride layer was in the range of approximately 140° C. to 190° C.

The ratio of the pollutants in the water layer as compared to the pollutants in the original aqueous solution of the pollutants was about 0.18 or 18%. From this it can be seen that a large percentage of the pollutants have been transferred from the aqueous solution of pollutants to the mixture of methylene chloride and pyridine.

Then, the water layer was extracted with 60 ml. of methylene chloride and 2 ml. of pyridine by mixing the water layer, shaking by hand, for about five (5) seconds at room temperature. Then this mixture was allowed to settle into a lower layer of methylene chloride, pyridine and pollutants, and an upper layer of water, pyridine and pollutants. The ratio of the pollutants in the water layer as compared to the pollutants in the original aqueous solution was approximately 0. The gas chromatograph did not show any boiling point range for the pollutants in the water layer. In other words, there was substantially a complete transfer of the pollutants from the water layer to the methylene chloride and pyridine layer. Or, the experiment was a success with respect to purifying the water from the pollutants.

EXAMPLE XVII

The aqueous solution of Example XI was used in this instance.

| Component: | Volume (ml.) |
|---|---|
| Aqueous solution of pollutants | 300 |
| Chloroform | 60 |
| Pyridine | 2 |

The mixture of the aqueous solution of pollutants, chloroform and pyridine was mixed, by shaking by hand, for about five (5) seconds at room temperature as in previous cold batch processes. Then this mixture was allowed to settle into a lower layer of chloroform, pyridine and pollutants and a first upper layer of water, pyridine and pollutants. The boiling point of the pollutants in the first upper layer of water was in the range of about 155° C. to about 175° C. The boiling point of the pollutants in the chloroform and pyridine layer was about 140° C. to about 190° C.

The ratio of the pollutants in the water layer as compared to the pollutants in the original aqueous solution of pollutants was about 0.23 or 23%. From this it can be seen that a large percentage of the pollutants have been transferred from the aqueous solution of pollutants to the mixture of chloroform and pyridine.

The first upper layer was mixed and shaken for about five (5) seconds at room temperature with 60 ml. of chloroform and 2 ml. of pyridine. Then this mixture was allowed to settle into a lower layer of chloroform, pyridine and pollutants and a second upper layer of water, pyridine and pollutants. The ratio of the pollutants in the second water layer as compared to the pollutants in the original aqueous solution of the pollutants was about 0.10 or 10%, and the ratio of pollutants in the second water layer as compared to the pollutants in the first water layer was about 0.44 or 44%. From this it can be seen that substantially all the pollutants have been transferred from the aqueous solution of pollutants to the mixture of chloroform and pyridine by shaking for about ten (10) seconds at room temperature.

EXAMPLE XVIII

The aqueous solution of Example XI was used in this instance.

| Component: | Volume (ml.) |
|---|---|
| Aqueous solution of pollutants | 300 |
| Carbon tetrachloride | 60 |
| Pyridine | 2 |

The mixture of the aqueous solution of pollutants, carbon tetrachloride and pyridine was mixed for about five (5) seconds at room temperature, by shaking by hand, as in previous cold batch processes. Then this mixture was allowed to settle into a lower layer of carbon tetrachloride, pyridine and pollutants, and a first upper layer of water, pyridine and pollutants. The temperature of the boiling point of the pollutants in the first upper water layer was in the range of about 150° C. to about 175° C. The temperature of the boiling point of the pollutants in the carbon tetrachloride layer was in the range of about 145° C. to about 190° C.

The ratio of pollutants in the first water layer as compared to the pollutants in the original aqueous solution of pollutants was about 0.41 or 41%. From this it can be seen that somewhat over half of the pollutants in the original aqueous solution of pollutants were transferred to the mixture of carbon tetrachloride and pyridine.

Then, the first upper water layer was mixed with 60 ml. of carbon tetrachloride and 2 ml. of pyridine and shaken for about five (5) seconds at room temperature. This mixture was allowed to settle into a lower layer of carbon tetrachloride, pyridine and pollutants and a second upper layer of water, pyridine and pollutants.

The ratio of the pollutants in the second water layer as compared to the pollutants in the original aqueous solution of pollutants was about 0.21 to 21%, and the ratio of the pollutants in the second water layer as compared to the pollutants in the first water layer was about 0.45 or 45%. From this it can be seen that a large percentage of the pollutants have been transferred from the aqueous solution of the pollutants to the mixture of carbon tetrachloride and pyridine.

EXAMPLE XIX

Another aqueous solution of pollutants was used.

| Component: | Volume (ml.) |
|---|---|
| Aqueous solution of pollutants | 300 |
| Carbon tetrachloride | 60 |
| Pyridine | 2.0 |

The aqueous solution of pollutants, carbon tetrachloride and pyridine was mixed for about five (5) seconds at room temperature by shaking by hand. Then, this mixture was allowed to separate into a lower layer of carbon tetrachloride, pyridine and pollutants, and an upper layer of water, carbon tetrachloride and pyridine. In the original aqueous solution of pollutants, the pollutants had a boiling point in the range of about 150° C. to approximately 190° C. In the water layer, the pollutants had a boiling point in the range of about 150° C. to about 165° C., and in the carbon tetrachloride layer, the pollutants had a boiling point in the range of about 145° C. to about 195° C.

The approximate ratio of pollutants in the water layer to the pollutants in the original aqueous solution was 0.31 or 31%, and the approximate ratio of pollutants in the carbon tetrachloride layer to the pollutants in the original aqueous solution was about 0.67 or 67%.

EXAMPLE XX

The aqueous solution of pollutants used in this example was the same as in Example XIX.

| Components: | Volume (ml.) |
|---|---|
| Aqueous solution of pollutants | 300 |
| Carbon tetrachloride | 60 |
| 2-picoline | 2.0 |

The aqueous solution of pollutants, carbon tetrachloride and 2-picoline was mixed for about five (5) seconds, by shaking by hand, at room temperature and then allowed to separate into a lower layer of carbon tetrachloride, 2-picoline and pollutants, and an upper layer of water, carbon tetrachloride and pyridine. In the lower layer of carbon tetrachloride the pollutants had a boiling point in the range of approximately 135° C. to about 190° C. In the water layer the pollutants had a boiling point in the range of about 150° C. to about 165° C. The approximate ratio of pollutants in the carbon tetrachloride as compared to the approximate quantity of pollutants in the original aqueous solution was about 0.80 or 80%, and the approximate ratio of pollutants in the water layer as compared with the approximate quantity of pollutants in the original aqueous solution of pollutants was about 0.31 or 31%.

EXAMPLE XXI

The aqueous solution of Example XIX was used in this example.

| Components: | Volume (ml.) |
|---|---|
| Aqueous solution of pollutants | 300 |
| Carbon tetrachloride | 60 |
| Piperidine | 2.0 |

In this cold batch process the aqueous solution of pollutants carbon tetrachloride and piperidine was mixed, by shaking by hand, for about five (5) seconds at room temperature and then allowed to separate into a lower layer of carbon tetrachloride, piperidine and pollutants, and an upper layer of water, carbon tetrachloride and piperidine. In the lower layer of carbon tetrachloride the pollutants had a boiling point in the range of approximately 135° C. to about 190° C., and in the water layer the pollutants had a boiling point in the range of about 150° C. to about 165° C. The approximate ratio of pollutants in the carbon tetrachloride as compared with the pollutants in the original aqueous solution of pollutants was about 0.56 and the approximate ratio of pollutants in the water layer as compared to the pollutants in the original aqueous solution was about 0.57.

EXAMPLE XXII

Another aqueous solution of pollutants was used.

| Components: | Volume (ml.) |
|---|---|
| Aqueous solution of pollutants | 300 |
| Methylene chloride | 60 |
| 2-picoline | 2.0 |

The aqueous solution of pollutants, methylene chloride and 2-picoline was mixed for about five (5) seconds at room temperature by shaking by hand. Then, this mixture was allowed to separate into a lower layer of methylene chloride, 2-picoline and pollutants, and an upper layer of water, methylene chloride and 2-picoline. In the original aqueous solution of pollutants, the pollutants had a boiling point in the range of about 150° C. to about 190° C. In the water layer, the pollutants had a boiling point in the range of about 165° C., and in the methylene chloride layer, the pollutants had a boiling point in the range of about 140° C. to about 190° C.

The approximate ratio of pollutants in the water layer to the pollutants in the original aqueous solution was 0.14 or 14%, and the approximate ratio of pollutants in the methylene chloride layer to the pollutants in the aqueous solution was about 0.90 or 90%. From this it can be seen that a substantial proportion of the pollutants transferred from the aqueous solution to the methylene chloride and 2-picoline.

EXAMPLE XXIII

The aqueus solution of pollutants used in this example was the same as in Example XXII.

| Component: | Volume (ml.) |
|---|---|
| Aqueous solution of pollutants | 300 |
| Trichloroethylene | 60 |
| 2-picoline | 2.0 |

The aqueous solution of pollutants, trichloroethylene and 2-picoline, was mixed for about five (5) seconds by shaking by hand, at room temperature and then allowed to settle into a lower layer of trichloroethylene, 2-picoline and pollutants, and an upper layer of water, trichloroethylene and 2-picoline. In the lower layer of trichloroethylene the pollutants had a boiling point in the range of approximately 140° C. to about 190° C. In the water layer the pollutants had a boiling point in the range of about 155° C. The approximate ratio of pollutants in the trichloroethylene as compared to the approximate quantity of pollutants in the original aqueous solution was about 0.75 or 75%, the approximate ratio of pollutants in the water layer as compared to the approximate quantity of pollutants in the original aqueous solution of pollutants was about 0.18 or 18%.

From this it is seen that a large percentage of the pollutants transfer from the aqueous solution of pollutants to the trichloroethylene and 2-picoline.

EXAMPLE XXIV

The aqueous solution of pollutants used in this example was the same as in Example XXII.

| Component: | Volume (ml.) |
|---|---|
| Aqueous solution of pollutants | 300 |
| Trichloroethylene | 60 |
| Piperidine | 2.0 |

The aqueous solution of pollutants, trichloroethylene and piperidine was mixed for about five (5) seconds at room temperature by shaking by hand. Then this mixture was allowed to separate into a lower layer of trichloroethylene, piperidine and pollutants, and an upper layer of water, trichloroethylene and piperidine. In the water layer, the pollutants had a boiling point in the range of about 150° C. to about 170° C., and in the trichloroethylene layer, the pollutants had a boiling point in the range of about 140° C. to 190° C.

The approximate ratio of pollutants in the water layer to the pollutants in the aqueous solution of pollutants was 0.46 or 46%, and the approximate ratio of pollutants in the trichloroethylene layer to the pollutants in the original aqueous solution was about 0.53 or 53%.

EXAMPLE XXV

Another aqueous solution of pollutants was used.

| Component: | Volume (ml.) |
|---|---|
| Aqueous solution of pollutants | 300 |
| 1,1,1,-trichloroethane | 60 |
| 2-picoline | 2.0 |

The aqueous solution of pollutants, trichloroethane and 2-picoline was mixed for about five (5) seconds at room temperature by shaking by hand. Then, this mixture was allowed to separate into a lower layer of trichloroethane, 2-picoline and pollutants, and an upper layer of water, trichloroethane and 2-picoline. In the original aqueous solution of pollutants, the pollutants had a boiling point in the range of about 145° C. to about 170° C. In the water layer, the pollutants had a boiling point in the range of about 150° C. to about 160° C., and in the trichloroethane layer the pollutants had a boiling point in the range of about 135° C. to about 190° C.

The approximate ratio of pollutants in the water layer to the pollutants in the original aqueous solution was about 0.20 or 20%, and the approximate ratio of pollutants in the trichloroethane layer to the pollutants in the original aqueous solution of pollutants was about 0.80 or 80%.

In the foregoing example, the aqueous solution of pollutants had material which was not dissolved. This material which was not dissolved remained as separate drops or entities in the aqueous solution of pollutants. It was not possible to take one microliter sample with discreet droplets of this material. Therefore, the original aqueous solution of pollutants was filtered before the solution was tested in the gas chromatograph. However, the separation of the pollutants from the aqueous solution was performed with the original aqueous solution having these discrete droplets or entities of matter. Therefore, the actual transfer of the pollutants from the water layer to the solvent layer was greater than indicated by the tests. To repeat, the original aqueous solution of pollutants was filtered before testing on the gas chromatograph while the solvent was mixed with the original aqueous solution of pollutants containing these discrete droplets of this matter. If, I had injected the one microliter sample containing these discrete droplets into the gas chromatograph, it is possible that I would have damaged the gas chromatograph and prevented it from properly functioning on later tests by overloading the column in the gas chromatograph.

In performing the analysis the gas chromatograph was set at the following state and conditions: Beckman Ten Inch Recorder; range one millivolt linear function; a zero setting; a chart speed of two inches per minute; the hydrogen flow is set at a positive polarity; the detector heater was set at a low position; the inlet was set at 35 units which is equal to 120° C.; the line was set at 35 units which is equivalent to 200° C.; the detector was set at 250, which is the equivalent at 240° C. in the gas chromatograph; the column was set at approximately 100° C. which is equal to about 85° C. to 90° C.; the output was set at 0, minus millivolt, and damping B: the attenuation was set 5,000, the suppression was set at span zero, mode plus, and range 6; in the linear programmer, the temperature was set at 200° C., the rise time at four minutes and the percent of rise time 10%; the hydrogen flow was set at 35 cc. per minute or 35 milliliters; two columns of type SE 30; the helium was set at 100 pounds; the breathing air was set at 41 pounds per square inch and the hydrogen was set at 27 pounds per square inch.

As an independent test with respect to the gas chromatograph, I injected a pure sample, U.S.P. grade phenol into the gas chromatograph and noted the temperature indicated by the gas chromatograph. This gas chromatograph indicated the temperature of approximately 145° C. to about 150° C. It is to be noted that the reference handbooks indicate that the boiling point of phenol is 181.8° C. This discrepancy in the boiling point of phenol as noted on the gas chromatograph and also the boiling point of phenol with respect to the reference handbook is to be noted.

I collected some of the pollutants 44 and 82 in a beaker. These pollutants had a high viscosity and were of a very dark color, almost completely black. I dipped a paper match into the pollutants and collected some of the pollutants on the end of the paper match. Then, I placed a lighted match underneath the pollutants on the end of the paper match and tried to burn the pollutants. The pollutants did not burn but, effervesced to form a foam. The foam acted as an insulator for the paper underneath the foam. Then, I scraped off the solid foam and examined the paper match underneath the foam. The paper underneath the protective foam was not damaged and was not burned. I repeated this experiment three or four times. The paper match would not burn in any of these experiments. From this, I consider that the pollutants have some fire protection properties. The pollutants act as a fire retardant and by foaming insulate the material on which they are placed.

From the foregoing and having presented my invention, what I claim is:

1. A method for purifying an aqueous composition of matter containing contaminants comprising preservative for wood and components of wood, said method comprising:
    (a) mixing said aqueous composition of matter with a heterocyclic compound containing nitrogen and a solvent selected from the group consisting of an aromatic halogen compound and an aliphatic halogen compound, to form a first composition of matter comprising said solvent and some of said contaminants and a second composition of matter comprising water and a trace of some of said contaminants; and
    (b) separating said water from said contaminants in said second composition of matter.

2. A method according to claim 1 and comprising:
    (a) filtering said second composition of matter to separate said contaminants from said water to release water substantially free from pollutants.
3. A method according to claim 1 and comprising:
    (a) separating said solvent from said contaminants.
4. A method according to claim 1 comprising:
    (a) said aromatic halogen compound containing chlorine and fluorine; and
    (b) said aliphatic halogen compound containing chlorine and fluorine.
5. A method according to claim 4 and comprising:
    (a) filtering said second composition of matter to separate said contaminants from said water to release water substantially free from pollutants.
6. A method according to claim 4 and comprising:
    (a) separating said solvent from said contaminants.
7. A method according to claim 4 and comprising:
    (a) filtering said second composition of matter to separate said contaminants from said water to release water substantially free from pollutants; and
    (b) separating said solvent from said contaminants.
8. A method according to claim 1 and comprising:
    (a) said aromatic halogen compound containing chlorine; and
    (b) said aliphatic halogen compound containing chlorine.
9. A method according to claim 1 and comprising:
    (a) said aliphatic halogen compound being selected from the group consisting of carbon tetrachloride; 1,1,1-trichloroethane; 1,1,2 - trichloroethylene; perchloroethylene; and chloroform and combinations thereof; and
    (b) said heterocyclic compound being selected from the group comprising pyridine, piperidine and picoline and combinations thereof.
10. A method according to claim 9 and comprising:
    (a) said aliphatic halogen being carbon tetrachloride.
11. A method according to claim 9 and comprising:
    (a) said aliphatic halogen being 1,1,1-trichloroethane.
12. A method according to claim 9 and comprising:
    (a) said aliphatic halogen being 1,1,2 - trichloroethylene.
13. A method according to claim 9 and comprising:
    (a) said aliphatic halogen being perchloroethylene.
14. A method according to claim 9 and comprising:
    (a) said aliphatic halogen being chloroform.
15. A method according to claim 9 and comprising:
    (a) said heterocyclic compound being pyridine.
16. A method according to claim 9 and comprising:
    (a) said heterocyclic compound being piperidine.
17. A method according to claim 9 and comprising:
    (a) said heterocyclic compound being picoline.
18. A method according to claim 1 and comprising:
    (a) performing said method at substantially prevailing ambient temperatures.
19. A method according to claim 1 and comprising:
    (a) mixing said aqueous composition of matter, said solvent and said heterocyclic compound by means of heat to form an aqueous mixture having a temperature in the range of about 70° C. to approximately 85° C.
20. A method for purifying a liquid composition of matter from a retort for treating and preserving wood wherein said composition of matter comprises creosote and components of wood, said method comprising:
    (a) allowing said liquid composition of matter to separate into a first phase rich in said creosote and said components and into a second phase comprising water and said creosote and said components of wood;
    (b) mixing said second phase with a heterocyclic compound containing nitrogen and a solvent selected from the group consisting of an aromatic halogen compound and an aliphatic halogen compound, to form a first composition of matter comprising said solvent and some of said contaminants and a second composition of matter comprising water and a trace of some of said contaminants; and
(c) separating said water from said contaminants in said second composition of matter.

21. A method according to claim 20 and comprising:
(a) filtering said second composition of matter to separate said contaminants from said water to release water substantially free from pollutants.

22. A method according to claim 20 and comprising:
(a) separating said solvent from said contaminants.

23. A method according to claim 20 and comprising:
(a) said aromatic halogen compound containing chlorine and fluorine; and
(b) said aliphatic halogen compound containing chlorine and fluorine.

24. A method according to claim 23 and comprising:
(a) filtering said second composition of matter to separate said contaminants from said water to release water substantially free from pollutants.

25. A method according to claim 23 and comprising:
(a) separating said solvent from said contaminants.

26. A method according to claim 23 and comprising:
(a) filtering said second composition of matter to separate said contaminants from said water to release water substantially free from pollutants; and
(b) separating said solvent from said contaminants.

27. A method according to claim 20 and comprising:
(a) said aromatic halogen compound containing chlorine; and said aliphatic halogen compound containing chlorine.

28. A method according to claim 20 and comprising:
(a) said aliphatic halogen compound being selected from the group consisting of carbon tetrachloride; 1,1,1-trichloroethane; 1,1,2-trichloroethylene; perchloroethylene; and chloroform and combinations thereof; and
(b) said heterocyclic compound being selected from the group comprising pyridine, piperidine and picoline and combinations thereof.

29. A method according to claim 28 and comprising:
(a) said aliphatic halogen being carbon tetrachloride.

30. A method according to claim 28 and comprising:
(a) said aliphatic halogen being 1,1,1-trichloroethane.

31. A method according to claim 28 and comprising:
(a) said aliphatic halogen being 1,1,2-trichloroethylene.

32. A method according to claim 28 and comprising:
(a) said aliphatic halogen being perchloroethylene.

33. A method according to claim 28 and comprising:
(a) said aliphatic halogen being chloroform.

34. A method according to claim 28 and comprising:
(a) said heterocyclic compound being pyridine.

35. A method according to claim 28 and comprising:
(a) said heterocyclic compound being piperidine.

36. A method according to claim 28 and comprising:
(a) said heterocyclic compound being picoline.

37. A method according to claim 20 and comprising:
(a) performing said method at substantially prevailing ambient temperatures.

38. A method according to claim 20 and comprising:
(a) mixing said aqueous composition of matter, said solvent and said heterocyclic compound by means of heat to form an aqueous mixture having a temperature in the range of about 70° C. to approximately 85° C.

References Cited

UNITED STATES PATENTS 2,474,705 6/1949 Vaughan et al. _____ 210—22
2,812,305 11/1957 Manka _____ 210—21

FRANK A. SPEAR, Jr., Primary Examiner